United States Patent Office.

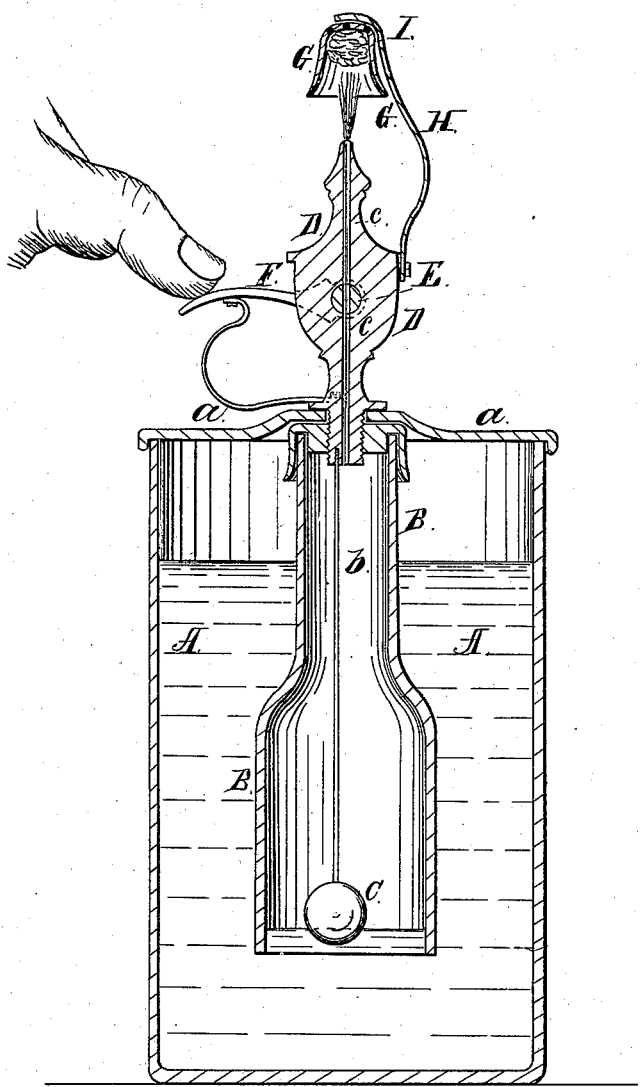

GUSTAV MÜLLER, OF NEWARK, NEW JERSEY.

Letters Patent No. 78,755, dated June 9, 1868; antedated June 4, 1868.

IMPROVED DÖBEREINER SELF-LIGHTING LAMP.

*The Schedule referred to in these Letters Patent and making part of the same.*

TO ALL WHOM IT MAY CONCERN:

Be it known that I, GUSTAV MÜLLER, of Newark, in the county of Essex, and State of New Jersey, have invented a new and improved Self-Lighting Apparatus; and I do hereby declare that the following is a full, clear, and exact description thereof, which will enable those skilled in the art to make and use the same, reference being had to the accompanying drawings, forming part of this specification, in which the drawing represents a sectional elevation of my invention.

Similar letters of reference indicate corresponding parts.

This invention relates to certain improvements on the well-known Döbereiner's inflammable lamp, and consists in arranging the tube through which the hydrogen passes in a vertical position, and in suspending the spongy platinum above the same, and in protecting the platinum in a perforated bell.

The incompleteness and insecurity of Döbereiner's lamp is only due to its incorrect construction. The main fault of the same is, that the hydrogen has to pass from its vertical channel into a horizontal outlet. As frequently small particles of the sulphuric acid are carried up with the hydrogen, the acid is deposited in the horizontal part of the channel, whence it cannot escape. Therein it corrodes the surrounding metal, and obstructs the passage, preventing the further escape of the hydrogen gas, and consequently making the apparatus inoperative.

By having the whole channel in a vertical position, the sulphuric acid that might have been raised by the hydrogen, will be allowed to flow back to its reservoir without injuring and obstructing the passage.

Another fault of Döbereiner's apparatus is, that the spongy platinum which is arranged opposite the outlet of the horizontal channel is not at all protected, so that it can be easily destroyed when the flame of burning paper or wood is by carelessness brought in contact with it, it being easily destroyed by a flame. The apparatus thereby, of course, also becomes inoperative. By securing the spongy platinum within a suspended bell, it will be completely covered and protected from injury.

A represents the vessel containing the diluted sulphuric acid.

B represents the tube, suspended within the vessel A from the cover $a$ of the same.

C represents the piece of zinc, suspended by means of a wire rod or string, $b$, from the cover $a$, within the tube B.

D represents a perforated block, or a tube, secured upon the cover $a$, so that the hole $c$ in the block communicates with the tube B, as shown. The hole $c$ is either entirely vertical, or inclined so that any sulphuric acid raised by the rising hydrogen gas may flow back into the reservoir.

E is a stop-cock, arranged through the block D, and provided with a suitable handle, F, so that by its means the escape of the hydrogen from the apparatus can be regulated at will.

G represents a bell, suspended from a rod or spring, H, which projects from the block D, cover $a$, or vessel A. The bell is suspended directly above the end of the channel $c$, and contains the spongy platinum I. The upper part of the bell may be perforated, to allow the rapid escape of heat from the platform.

When the cock E is opened, the air in the flask will be displaced by the acid from beneath, and hydrogen will be immediately evolved by the contact of the zinc with the acid. The gas issues from the fine jet, and is directed against the platinum, combining with the oxygen condensed within the same, so as to form water. The heat thus liberated is sufficient to ignite the platinum, and to inflame the gas which subsequently issues from the jet.

I claim as new, and desire to secure by Letters Patent—

1. Providing an inflammable lamp with a vertical or inclined channel, $c$, substantially as described, for the purpose of preventing the accumulation of sulphuric acid in the channel, as set forth.

2. Securing the spongy platinum of an inflammable lamp within a bell, G, for the purpose of protecting the same, as set forth.

3. A self-lighting lamp, when provided with a vertical or inclined channel, $c$, and with a bell, G, suspended above the outlet of the channel, all made and operating substantially as and for the purpose herein shown and described.

GUSTAV MÜLLER.

Witnesses:
JOSEPH TRABOLD,
HERMAN STOECKEL.